United States Patent
Kastner et al.

(10) Patent No.: US 11,990,623 B2
(45) Date of Patent: May 21, 2024

(54) METHOD FOR APPLYING POLYMER PATCHES ONTO A SUBSTRATE

(71) Applicant: Collin Lab & Pilot Solutions GmbH, Maitenbeth (DE)

(72) Inventors: Friedrich Kastner, Grieskirchen (AT); Franz Grajewski, Wasserburg (DE)

(73) Assignee: Collin Lab & Pilot Solutions GmbH (DE)

( * ) Notice: Subject to any disclaimer, the term of this patent is extended or adjusted under 35 U.S.C. 154(b) by 3 days.

(21) Appl. No.: 17/051,377

(22) PCT Filed: Sep. 27, 2018

(86) PCT No.: PCT/EP2018/000455
§ 371 (c)(1),
(2) Date: Oct. 28, 2020

(87) PCT Pub. No.: WO2019/105577
PCT Pub. Date: Jun. 6, 2019

(65) Prior Publication Data
US 2021/0313577 A1    Oct. 7, 2021

(30) Foreign Application Priority Data
Nov. 30, 2017  (EP) ..................................... 17001963

(51) Int. Cl.
| | |
|---|---|
| *H01M 4/60* | (2006.01) |
| *H01M 4/04* | (2006.01) |
| *H01M 10/052* | (2010.01) |
| *B05C 1/08* | (2006.01) |
| *B05C 1/16* | (2006.01) |
| *B05D 1/26* | (2006.01) |
| *B05D 1/28* | (2006.01) |
| *H01M 4/139* | (2010.01) |

(52) U.S. Cl.
CPC ......... *H01M 4/602* (2013.01); *H01M 4/0409* (2013.01); *H01M 4/0411* (2013.01); *H01M 10/052* (2013.01); *B05C 1/08* (2013.01); *B05C 1/0817* (2013.01); *B05C 1/16* (2013.01); *B05D 1/265* (2013.01); *B05D 1/28* (2013.01); *H01M 4/0404* (2013.01); *H01M 4/0483* (2013.01); *H01M 4/139* (2013.01)

(58) Field of Classification Search
CPC ............. H01M 4/0404; H01M 4/0409; H01M 4/0411; H01M 4/0483; H01M 4/139; H01M 4/602; B05D 1/265; B05D 1/28; B05C 1/08; B05C 1/0817; B05C 1/16
USPC ................. 427/98.4, 115; 428.06; 428/218.1
See application file for complete search history.

(56) References Cited

U.S. PATENT DOCUMENTS

| | | | |
|---|---|---|---|
| 3,993,508 A | 11/1976 | Erlichman | |
| 4,614,026 A | 9/1986 | Plasse | |
| 4,806,441 A | 2/1989 | Brezillon | |
| 5,154,121 A * | 10/1992 | Schneider | ................ B41M 1/10 101/401.1 |
| 5,824,156 A * | 10/1998 | Watanabe | ............... F16K 23/00 118/410 |
| 6,409,867 B1 * | 6/2002 | Kronfli | ............... H01M 4/0404 524/297 |
| 7,575,606 B2 * | 8/2009 | Fukumoto | ........... H01M 4/0404 29/623.1 |
| 9,450,231 B2 * | 9/2016 | Madray | ............... H01M 4/1397 |
| 10,116,000 B1 * | 10/2018 | Federici | ................ H01M 4/139 |
| 10,723,846 B2 * | 7/2020 | Sonntag | ................ H01M 4/485 |
| 2002/0127464 A1 | 9/2002 | Terazawa et al. | |
| 2007/0072083 A1 | 3/2007 | Ikuta et al. | |
| 2008/0050654 A1 * | 2/2008 | Stevanovic | ........... H01M 4/662 429/221 |
| 2008/0083367 A1 * | 4/2008 | Wakai | ................. H01M 4/0404 118/200 |
| 2008/0143906 A1 * | 6/2008 | Allemand | .............. H05K 3/249 313/503 |
| 2009/0092742 A1 * | 4/2009 | Teramoto | ................ B05C 1/165 427/9 |
| 2009/0186550 A1 * | 7/2009 | Foust | .................. H01L 27/3204 445/63 |
| 2012/0241203 A1 * | 9/2012 | Kuwabara | .............. H05K 1/118 174/257 |
| 2013/0157105 A1 | 6/2013 | Picard et al. | |
| 2016/0141604 A1 | 5/2016 | Lahlouh et al. | |
| 2017/0170452 A1 * | 6/2017 | Uchida | ............... H01M 4/0404 |

FOREIGN PATENT DOCUMENTS

| | | | |
|---|---|---|---|
| EP | 1696499 B1 | 6/2012 | |
| JP | 2001-179151 | * 3/2001 | ............... B05C 1/08 |
| JP | 2013134897 A | * 7/2013 | |

OTHER PUBLICATIONS

International Search Report for PCT/EP2018/000455 dated Jan. 30, 2019; 3 pages.

* cited by examiner

*Primary Examiner* — Brian K Talbot
(74) *Attorney, Agent, or Firm* — Lerner David LLP

(57) ABSTRACT

The invention relates to a method for applying polymer patches, in particular from polymer electrode material, on a carrier substrate, including the following method steps:
  a) plasticizing the polymer electrode material to form a melt,
  b) feeding the plasticized polymer electrode material via at least one die to a heated, structured roller or to a heated, structured conveyor belt, wherein the roller and/or the conveyor belt have recesses that correspond to the dimensions of the patches to be applied,
  c) applying the plasticized polymer electrode material on a carrier substrate by bringing the roller and/or the conveyor belt in contact with a carrier substrate.

7 Claims, No Drawings

METHOD FOR APPLYING POLYMER PATCHES ONTO A SUBSTRATE

CROSS REFERENCE TO RELATED APPLICATIONS

The present application is a national stage entry under 35 U.S.C. § 371 of International Application No. PCT/EP2018/000455, filed on Sep. 27, 2018, which claims priority from European Patent Application No. 17001963.2, filed on Nov. 30, 2017, all of which are hereby incorporated herein by reference.

The invention relates to a method for the register-accurate application of polymer patches onto a substrate.

In the manufacture of lithium-polymer batteries or lithium-polymer accumulators, a polymer electrode material is coated or extruded onto a carrier substrate either over the entire surface or in webs. For coating, a solvent-based material is used; for an extruded layer, polymer melts are used.

In general, aluminum or copper films are used as carrier substrates for the polymer electrode material.

In this regard, necessary separations of the regions with polymer electrode material transverse to the web are produced either by punching or by means of laser ablation. This requires an additional working step.

In a further known method, one or several dies which defined the longitudinal webs are equipped with closing devices that allow an intermittent material flow and thus generate polymer fields directly on the substrate surface. However, the disadvantage of this method is that the melt break-off cannot be precisely defined in length by the shutter mechanism (shutter) and in width by effects such as "neck in", and thus no precisely separated fields can be created, let alone fields structured in terms of shape or surface.

It was the object of the present invention to provide a method for applying patches, in particular of polymer electrode material, in which the shortcomings of the prior art can be overcome.

Therefore, the subject matter of the invention is a method for applying polymer patches, in particular from polymer electrode material, on a carrier substrate, characterized by the following method steps:
  a) plasticizing the polymer electrode material to form a melt,
  b) feeding the plasticized polymer electrode material via at least one die to a heated, structured roller or to a heated, structured conveyor belt, wherein the roller and/or the conveyor belt have recesses that correspond to the dimensions of the patches to be applied,
  c) applying the plasticized polymer electrode material on a carrier substrate by bringing the roller and/or the conveyor belt in contact with a carrier substrate.

Preferably, the application of the polymer electrode material is carried out by means of a roller, i.e. in a rotative process.

By this method, thus, precisely defined polymer fields can be applied onto a surface. These fields can also be applied in a register-accurate manner onto already present structures in almost any desired shape and structuring. An additional working step, such as punching or laser ablation, can be dispensed with. Moreover, the thus generated polymer patches are precisely delimited in their shape. By this method, patches structured and precisely shaped in their surface can be created.

In a first method step, the polymeric electrode material is plasticized in the usual known way by means of an extruder, for example a single extruder, a twin extruder or multi-screw extruder, a melt pump, a piston accumulator and similar equipment. The polymer electrode material can also be plasticized in multiple steps, optionally also using combinations of these devices.

In this regard, depending on the requirements, an individual polymer material or multiple different polymer materials are plasticized and optionally mixed. Depending on the application, different polymers such as polyolefins (PP, PE, HDPE, LDPE, LLDPE), PA, PET, PEN, PEI, PPS, PPSU and the like are used in this regard.

The properties of these materials can be influenced in a targeted manner, for example by filling materials such as C (graphite, graphene) or conductive fibers or particles of metals, alloys or intrinsically conductive polymers, such as polyanilia, PDOT (polyetherdioxythhiophene). These additives influence the conductivity of the polymers.

Especially in batteries, these additives influence the electro negativity, whereby the polymer patches can act directly as an anode or as a cathode. Moreover, combinations of the materials and/or additives in one layer as well as combinations in several different layers are also conceivable.

The plasticized electrode material is then transported via one or more dies to a roller or to a conveyor belt.

Both mono-layer and multi-layer systems, i.e. mono-dies or dies with upstream feed block or multi-manifold can be used. These systems can also be used in combinations.

In this regard, the material flow can be conveyed continuously or can also be forwarded via variable conveying systems, for example be modulated by varying the rotational speed of the extruder or the melt pump, of melt valves or shutter mechanisms and the like.

The melt is then applied to a roller or conveyor belt via one or more dies arranged next to one another.

The roller or the conveyor belt is structured in longitudinal and/or transverse direction and shows structures, in particular depressions, which represent the later polymer patch in negative form. The recesses thus correspond to the shape of the polymer patches to be applied in their shape and dimensions.

These structures can for example, depending on the desired property of the patch, have smooth or structured surfaces and can be produced galvanically, by means of a laser, eroded, embossed, engraved, etched or be produced by any other process.

By means of suitable methods such as electroplating, sputtering, vapor deposition, CVD or PVD or spray processes, the surface energy of the roller and the recesses can be influenced in a targeted manner to adjust the adhesion or detachment of the polymer.

To maintain the sufficient flowability of the melt, the roller and/or the conveyor belt is tempered and/or heated. This can be carried out for example electrically, e.g. by induction or resistance heating, or via heat transfer media such as water or thermal oil or via radiation (e.g. infrared).

The structures of the roller can be applied directly to the roller surface or to layers applied previously, for example by galvanic processes or by spraying onto the roll surface. Typically, the processes known from printing technology for the production of printing rollers or printing plates, such as engraving, etching, direct laser or electron beam ablation, or wash-out processes are used to produce these structures.

Advantageously, the roller or the conveyor belt has a surface coating at least in the area of the recesses that define the shape and dimensions of the polymer patches, wherein the surface coating, in the subsequent method step of applying the polymer patches to a carrier substrate, influences the removal of the polymer patches from the roller in a targeted manner.

Depending on the material of the rollers (metal, alloys, polymers, ceramics), different surface coating or combinations thereof can be used.

Moreover, it is possible to coat the roller and/or the conveyor belt with a separation agent before or at intervals of the melt application in order to enable the targeted removal of the polymer patches.

Temperature control of the roller is also important in order to cool the patches down sufficiently to ensure that they have a sufficient strength to remain securely in the recesses and still anchor after application on the carrier substrate.

Optionally, the polymer patches can also be applied by a multilayer or coex application, wherein, for example, multiple thin layers are applied in a register-accurate manner on top of one another to achieve the corresponding dimensions.

To ensure that the polymer melt is present only in recesses of the roller, the excess melt is removed by means of a doctor blade which is also tempered. In the simplest case, the doctor blade here is a kind of blade that slides over the cylinder in a fixed or oscillating manner and at adjustable angles, similar as in gravure printing. Hence, the excess material outside the recesses on the roller or conveyor belt is removed.

It is also possible to use a rotating squeeze roll, as with two- or multi-roller applicators, or a doctor belt that is pulled across the patch roller. In this case, the doctor belt is also guided over the cylinder from a reservoir and the excess melt is removed. Furthermore, a cleaning screw mounted transversely to the patch roller can also be used. These systems can be used individually or in combinations.

The excess material can be guided back into the extruder either after solidification or immediately as a melt.

Moreover, the die and/or the dies can also be combined with the doctor blade mechanism in order to ensure targeted application into the recesses of the roller and/or the conveyor belt.

Below the roller and/or the conveyor belt, the substrate to be coated runs over a roller (carrier roller), which is also tempered, and is brought into contact with the structured roller and/or the structured conveyor belt.

Depending on the polymer material used, the nature of the carrier substrate and the dimensions of the polymer patches, the carrier roller guides the carrier substrate to the structured roller and/or the structured conveyor belt at a defined angle, at a defined temperature and under a defined contact pressure. Optionally, the carrier substrate can be preheated via heat radiation or contact rollers or convection.

Multiple layers can be applied in a register-accurate manner above or next to one another by means of suitable known register controls.

Optionally, the carrier substrate can be treated via suitable pretreatment steps such as plasma, flame or corona processes, or by applying a primer in such a way that the patches can be easily removed from the recesses of the roller or of the conveyor belt and securely anchored to the carrier substrate.

For special applications, the recesses of the roller and/or the conveyor belt defining the shape and dimensions of the polymer patch can be provided with macro or micro structures. Macro structures are structures with a size (lateral and vertical) of at least 1 mm; micro structures have a size of less than 1 mm to about 0.01 mm.

Such macro or micro structures are used to achieve specific properties and/or to improve the absorption of the electrolyte in polymer batteries or polymer accumulators.

The quality of the structures is influenced by the temperatures, the cooling, the demolding (coating) and the pressure of the rollers:

In a special method, the roller is sectionally heated by an induction heating field mounted from the outside or inside in the region of the polymer application and locally heated such that the surface of the regions forming the structures is brought to a temperature significantly higher than the basic temperature of the roller required for cooling the material for demolding before the polymer material is applied.

This temperature increase has the advantage that the viscosity of the melt is not reduced when it hits the surface to be structured and that the melt can penetrate the structure.

At the end of the range of material entry, the induction heating is switched off by the controller such that the temperature required for demolding above the basic temperature of the roller is reached.

External application of the induction field can be controlled by the parameters length of the area to be printed, line speed and power.

In case of an induction field arranged at the inside of the roller, it is necessary to additionally consider the position of the coils required for the generation of the field.

The invention claimed is:

1. A method for applying polymer patches from polymer electrode material on a carrier substrate, comprising:
   a) plasticizing the polymer electrode material to form a melt,
   b) feeding the plasticized polymer electrode material via at least one die to a heated, structured roller or to a heated, structured conveyor belt, wherein the roller and/or the conveyor belt have recesses having dimensions that are the same as dimensions of the patches to be applied, such that shapes of the recesses are negative forms of shapes of the patches, the feeding of the plasticized polymer electrode material including applying a contact pressure to the melt to fill the recesses, and
   c) applying the plasticized polymer electrode material on a carrier substrate by bringing the roller and/or the conveyor belt in contact with a carrier substrate.

2. The method according to claim 1, wherein the electrode material is plasticized in one or multiple steps by means of an extruder, a melt pump and/or a piston accumulator.

3. The method according to claim 1, wherein the excess polymer electrode material is removed from the roller and/or the conveyor belt by means of a doctor blade, a doctor blade belt or a squeeze roll.

4. The method according to claim 1, wherein the recesses additionally have micro or macro structures.

5. The method according to claim 4, wherein the recesses and the micro or macro structures are created by means of an engraving, etching or laser method.

6. The method according to claim 1, wherein the roller and/or the conveyor belt have a surface coating.

7. The method according to claim 1, wherein the carrier substrate is brought into contact with the roller and/or the conveyor belt via a carrier roller.

* * * * *